(12) United States Patent
Tobioka

(10) Patent No.: US 8,140,968 B2
(45) Date of Patent: Mar. 20, 2012

(54) MEDIUM WHICH RECORDS PROGRAM FOR CONTROLLING ICON OF DOCUMENT FILE, CONTROL COMPUTER, AND CONTROLLING METHOD

(75) Inventor: Masato Tobioka, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1750 days.

(21) Appl. No.: 11/186,588

(22) Filed: Jul. 21, 2005

(65) Prior Publication Data
US 2006/0212819 A1 Sep. 21, 2006

(30) Foreign Application Priority Data
Mar. 16, 2005 (JP) .................................. 2005-074737

(51) Int. Cl.
*G06F 17/00* (2006.01)
(52) U.S. Cl. ....................................... 715/275; 715/200
(58) Field of Classification Search .................. 715/255, 715/200, 275
See application file for complete search history.

(56) References Cited

U.S. PATENT DOCUMENTS

| | | | | |
|---|---|---|---|---|
| 5,479,602 A | * | 12/1995 | Baecker et al. ............... | 715/838 |
| 5,680,558 A | * | 10/1997 | Hatanaka et al. ............. | 715/838 |
| 5,751,287 A | * | 5/1998 | Hahn et al. .................... | 715/775 |
| 6,356,908 B1 | * | 3/2002 | Brown et al. .................. | 707/10 |
| 6,616,702 B1 | * | 9/2003 | Tonkin .......................... | 715/209 |
| 7,075,550 B2 | * | 7/2006 | Bonadio ........................ | 345/589 |
| 7,086,011 B2 | * | 8/2006 | Budrys et al. ................. | 715/837 |
| 7,546,522 B2 | * | 6/2009 | Tolle et al. .................... | 715/215 |
| 2004/0051743 A1 | | 3/2004 | Gonsho ......................... | 715/847 |

FOREIGN PATENT DOCUMENTS

| | | |
|---|---|---|
| JP | 8161314 | 6/1996 |
| JP | 11334180 | 12/1999 |
| JP | 2000137589 | 5/2000 |
| JP | 2004110127 | 4/2004 |

OTHER PUBLICATIONS

Japanese Notice of Grounds of Rejection and English translation thereof, mailed on Jan. 5, 2010, relating to Japanese Application No. 2005-074737.

* cited by examiner

*Primary Examiner* — Manglesh M Patel
(74) *Attorney, Agent, or Firm* — Gesmar Updegrove LLP (57) ABSTRACT

A recording medium stores a program which, when executed, allows a computer to perform a function comprising: obtaining a color attribute of a document file, and displaying a document icon which represents the document file and has an image reflecting the obtained color attribute.

22 Claims, 7 Drawing Sheets

MEDIUM WHICH RECORDS PROGRAM FOR CONTROLLING ICON OF DOCUMENT FILE, CONTROL COMPUTER, AND CONTROLLING METHOD

PRIORITY INFORMATION

This application claims priority to Japanese Patent Application No. 2005-074737, filed Mar. 16, 2005, which is incorporated herein by reference in its entirety.

BACKGROUND OF THE INVENTION

1. Field of the Invention

The present invention relates to a technique for controlling an icon displayed on a computer display screen, and in particular to a technique for controlling display of an icon based on a color attribute of a document file.

2. Description of the Related Art

Icons are commonly displayed on a display screen of a computer such as a personal computer. An icon refers to an image displayed on a display screen to indicate a function provided in the computer; data of files, directories, etc., managed by the computer; and various setting conditions which are set in the computer. For example, when files are displayed in a list, an icon may be displayed having an image indicating the type of file (such as text file, word processor software file, etc.) along with the name of the file and the date and time of creation on a display column of each file. In addition, when the content of a file is displayed or edited, an icon may be displayed having an image reflecting an attribute regarding the content of the file and executability of the file in order to provide the user with intuitional understanding of the file.

It is also possible to provide, with the icon, a function for manipulating a corresponding function, data, and setting. For example, a user may move a file by dragging-and-dropping a document icon representing a document file onto an icon of a directory. Alternatively, a user may drag-and-drop the document icon to an icon (representing an output) of a printer to print the document file. A document file refers to a file in which a text, a number, a drawing, and a photograph, etc. are placed, and is a file which is expressed in a text code data format or image data format.

When the user drags-and-drops a document icon to a printer icon to execute the printing function, the document is generally printed based on the printing attribute which has been set in the printer. Therefore, when the printing attribute differs from the attribute of the document file, the user cannot obtain a desired printing result. For example, when the output paper size, which is a printing attribute, is set to A4 size, an A3 size document is commonly reduced and output. When the output paper is set in a vertical orientation, the layout of a document created assuming a horizontal orientation may be printed with distorted layout. Such a configuration is not only disadvantageous from the viewpoint of providing a comfortable working environment to the user, but also from the viewpoint of possibly forcing re-printing by the user, resulting in increased printing costs and wasted printer resources, such as paper, toner, or the like.

This problem becomes particularly significant when color printing and monochrome printing are mistaken during execution of a printing process. When a document which is monochromatically expressed is printed in color, color printing resources are wasted for printing the document which only requires monochrome printing. When, on the other hand, a document which is expressed in color is monochromatically printed, the document must be printed again in color because color information cannot be recognized in the monochrome document. Currently, however, because icons tend to all have a color image, there are many cases in which a monochrome document file is printed in color or a document is printed in color even through there is only a very small color region within the document, resulting in the printing waste.

Another problem associated with a printing process using an icon relates to cases in which a plurality of printers are set as being printable or a plurality of print settings are enabled within one or a plurality of printers. More specifically, in these cases, in general, the user may not be able to find an optimum printer or print setting, or many steps may be required even when the user can find the desired printer or desired print setting.

SUMMARY OF THE INVENTION

According to one aspect of the present invention, there is provided a recording medium which stores a program which, when executed, allows a computer to perform a function comprising: obtaining a color attribute of a document file, and displaying a document icon which represents the document file and has an image reflecting the obtained color attribute.

According to another aspect of the present invention, there is provided a computer comprising a file attribute obtaining unit which obtains a color attribute of a document file, and a display which displays a document icon which represents the document file and has an image reflecting the obtained color attribute.

According to another aspect of the present invention, there is provided a method executed in a computer comprising: obtaining a color attribute of a document file, and displaying a document icon which represents the document file and has an image reflecting the obtained color attribute.

According to another aspect of the present invention, there is provided a recording medium which stores a program which, when executed, allows a computer to perform a function comprising: obtaining an attribute of a document file; displaying a document icon which represents the document file and has an image reflecting the obtained attribute; comparing the attribute and at least one print setting of at least one printer to which an output setting from the computer is set; determining a print setting suitable for printing of the document file based on a result of comparing; and displaying a printer icon which represents a print setting determined as being suitable for the printing in a manner to attract attention when the document icon of the document file is selected by a user.

BRIEF DESCRIPTION OF THE DRAWINGS

Preferred embodiments of the present invention will be described in detail based on the following figures, wherein.

DESCRIPTION OF THE PREFERRED EMBODIMENT

Figure 1:
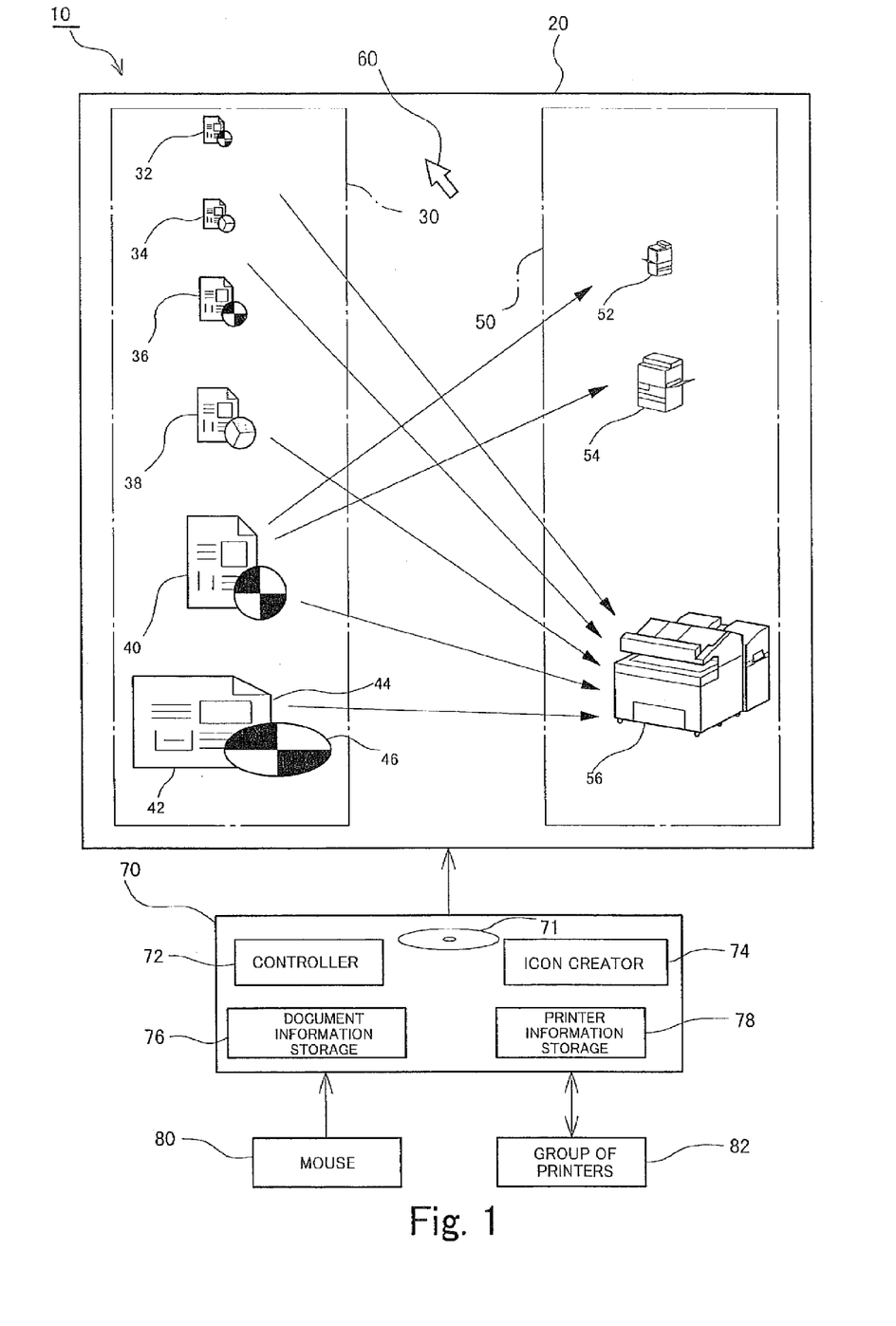
FIG. 1 is a diagram explaining a schematic structure of a computer system.

FIG. 1 is a diagram for explaining a schematic structure of a computer system 10 according to a preferred embodiment of the present invention. The computer system 10 comprise a display 20 as a display screen, a computer unit 70 which is a hardware having a computation function, a mouse 80 which is a user input device, and a group of printers 82 including one or a plurality of printers connected directly by cables or through a network.

The display 20 is a device which displays an image based on an image output signal sent from the computer unit 70, and typically, displays an image based on a GUI (graphical user interface) having a window system. FIG. 1 schematically shows a screen display of a desktop on which document icons 30, printer icons 50, and a pointer 60 are displayed.

The document icons 30 are icons associated with document files managed by the computer unit 70. The document icons 30 include an A4 monochrome icon 32, an A4 color icon 34, an A3 monochrome icon 36, an A2 color icon 38, an A1 monochrome icon 40, and an A0 monochrome icon 42. Here, the name of the icon is assigned based on the attribute of the document associated with the icon. For example, the A4 monochrome icon 32 is associated with a document having a set paper size of A4 and monochrome color (single color) and the A4 color icon 34 is associated with a document having a paper size of A4 and color (plurality of colors). Normally, the name is not displayed on the display screen. Instead, as will be described next, characteristics of the document file are represented by an image of the icon.

The size and orientation of the image of the icon are set corresponding to the paper setting of the associated document. That is, the size of the image of the icon is set in steps (for example, proportional steps) so that the size is increased as the size of the document increases from A4 size to A3 size, A2 size, A1 size, and A0 size. The shape of the icon is set to be elongated in vertical direction when the paper is in portrait orientation and elongated in horizontal direction when the paper is in landscape orientation. With such a configuration, the user can easily understand the paper size and paper direction of the document file associated with the icon simply by viewing the size and shape of the icon.

The coloration of the image of the icon is based on the associated document. In other words, when the document file represented by the icon is monochromatically expressed, the image of the icon is monochrome (typically, black and white) and when the document file is expressed in color, the image of the icon is shown in color. In the example shown on FIG. 1, the images of the A4 color icon 34 and the A2 color icon 38 are created in color and the remaining document icons are created in monochrome. With this configuration, the user can immediately visually recognize whether the document file is in color or monochrome.

The image of the icon further represents detailed information regarding the associated document. For example, regarding the A0 monochrome icon 42, a document display image 44 and a region percentage display image 46 are combined in the image of the icon. The document display image 44 indicates that this icon is associated with a document file and is created by abstracting a document in which text and photograph are mixed, which is a typical document. Therefore, the user can recognize that this icon represents a document file rather than a directory or an application program. The region percentage display image 46 indicates the portion of the total region of the document appearing in each color contained in the document. That is, when the document file is a monochrome document, sizes of the white portion (portion in which a toner or ink is not used) and the black portion (a portion in which a toner or ink is used) on the paper are shown in a pie chart. When the document file is a color document, sizes of the white portion, black portion, and a portion of other colors (a portion in which a color ink is used) on the paper are shown in a pie chart. Alternatively, it is also possible to show a pie chart showing a ratio of amount of usage of toner or ink of each color of CMYK colors. With this configuration, the user can intuitionally know the density of the document for a monochrome document and recognize information such as what colors constitute the document or whether the actual proportion of color regions is large or small for a color document.

The printer icons 50 are icons associated with each printer belonging to the group of printers 82 which is set to be printable from the computer unit 70 and include an A4 color printer icon 52, an A3 monochrome printer icon 54, and an A0 printer icon 56. The name of the printer icon represents the paper size which is set to the printer and the chromatic information of the printer. For example, the A4 color printer icon 52 represents a color printer in which the output paper is set to A4 size. The A0 printer icon 56 represents a printer having the output paper set to A0 size and which can print both in color and monochrome through automatic determination of the document file.

Similar to the document icons, normally, the name of the printer is not displayed on the display screen and the characteristics of the document file are represented by the image of the icon. In other words, the size of the icon is set based on the set size of the paper. In addition, a color printer icon is displayed for the color printer and a black-and-white printer icon is displayed for the monochrome printer.

In the above description, an example is described in which the group of printers 82 include three printers and the printer icon corresponding to a setting is shown in one to one relationship with the printer. Alternatively, it is also possible to display plural printer icons corresponding to plural settings for a printer.

The pointer 60 shows a position of operation target of the mouse 80 which is inputting means of the user. The user moves the position of the pointer 60 and operates with the displayed icon to perform operations such as selection, dragging, and dropping of the icon.

The computer unit 70 is a central unit of the computer system 10 and includes a hardware which comprises an arithmetic unit such as a CPU, a storage such as a semiconductor memory and a hard disk drive, and an input/output device which inputs and outputs a signal from and to an external device.

Characteristic functional components of the computer device 70 include a storage medium 71, a controller 72, an icon creator 74, a document information storage 76, and a printer information storage 78. The controller 72 controls these functional components, display 20, mouse 80, and group of printers 82 based on a program installed through the recording medium 71, etc. The icon creator 74 manages creation and display of the icon to be displayed on the display 20 according to an instruction from the controller 72 and based on a program. The document information storage 76 obtains and stores attribute data of a document file stored in the computer unit 70 such as, for example, paper attributes (size and orientation) and color attributes (whether the document is monochrome or color, the percentage of the region of each color, etc.). The printer information storage 78 obtains and stores print setting data of the printer included in the group of printers 82 such as, for example, paper attributes (size, orientation, N-up setting, and duplex print setting) and print color attribute (whether the printer is monochrome or color).

With this device configuration, the user can print a document by moving a pointer 60 using the mouse 80 while viewing the document icon and the printer icon displayed on the display 20 and dragging-and-dropping the document icon to the printer icon, as shown by a straight arrow in FIG. 1. For example, the user can drag-and-drop the A0 monochrome icon 42 to the A0 printer icon 56 to print a document associated with the A0 monochrome icon 42 from a printer associated with the A0 printer icon 56.

When printing, the user can select a printer in which the paper size is suitably set referring to the size of the document icon and the size of the printer icon. In addition, the user can refer to the color of the document icon and the color of the printer icon so that a color document can be output from the color printer and a monochrome document can be output from the monochrome printer. In this manner, it is possible to print a document with a suitable size and color. Moreover, the user can intentionally output, for example, a document which is expressed in color but in which the color region is very small through the monochrome printer by referring to the region percentage display image 46 in the document icon.

Figure 2A:
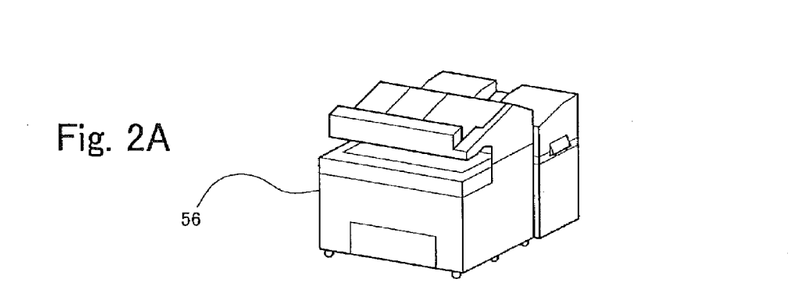
FIGS. 2A and 2B are diagrams showing an example setting of paper size for a printer.
Figure 2B:
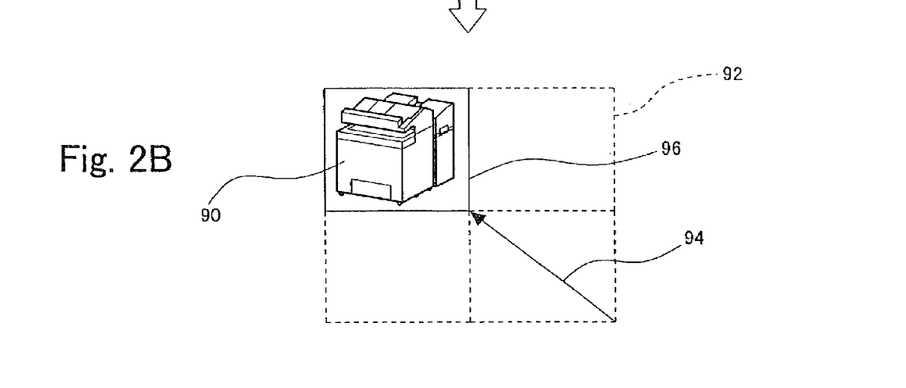

When there is no printer having an attribute setting matching with the attribute of the document file, it is possible to operate on the icon to input the setting. FIG. 2A and 2B are schematic diagrams showing an example setting. In FIG. 2A, the A0 printer icon 56 shown in FIG. 1 is displayed on the desktop. When the user wishes to print on A2 size paper, the user reduces the image of the A0 printer icon 56 to create an A2 printer icon 90 as shown in FIG. 2B. That is, the user selects, with the mouse, an image boundary 92 of the A0 printer icon 56, reduces and moves the selected image boundary 92 to a size of ¼ as shown by an arrow 94, and releases the mouse at an image boundary 96 corresponding to the A2 size. With this process, the icon creator 74 creates and displays an A2 printer icon 90 and the controller 72 sets the printer so that when the A2 printer icon 90 is selected, the document is printed on A2 size paper.

The changing of setting of the association destination of the icon through operation on the icon can be performed not only for the printer icons, but also for the document icons. Specifically, the user can change the set paper size by changing the size of the document icon, the set paper orientation by changing the shape between the portrait and landscape shapes, and change between color and monochrome for an image by changing the color of the document icon. More specifically, the user can change a color file into a monochrome gray scale image by changing a color icon into a monochrome icon or change a representation format of a monochrome file to color format such as RGB by changing a monochrome icon into a color icon. By allowing a change in setting by icon operation in this manner, it is possible to allow the user to intuitively set a desired setting without opening a setting window.

Next, a drag-and-drop process of a document icon will be described referring to FIG. 3. FIGS. 3A-3C are diagrams chronologically showing a process of operating an icon shown in FIG. 1 as time elapses.

Figure 3A:
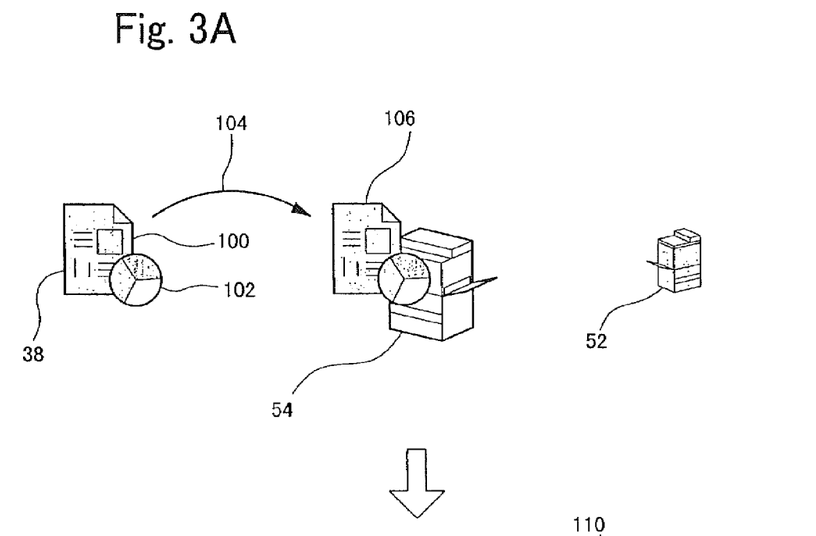
FIGS. 3A, 3B and 3C are diagrams explaining an example display when a document icon is dragged.

In FIG. 3A, the user selects the A2 color icon 38 by operating the mouse. In the image of the A2 color icon 38, a document display image 100 which is displayed in color and a region percentage display image 102 are combined. The user drags the A2 color icon 38 to achieve movement 104 and places the A2 color icon 38 on the A3 monochrome printer icon 54. As a result, an A2 color icon 106 is superposed to the A3 monochrome printer icon 54 and these icons are correlated with each other. At this point, the user is not performing any operation with respect to the A4 color printer icon 52.

Figure 3B:
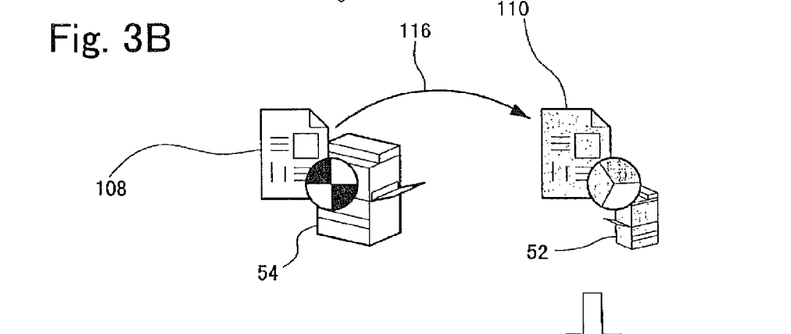

At the step of FIG. 3B, the A2 color icon 106 placed on the A3 monochrome printer icon 54 is changed to an A3 monochrome icon 108, that is, an icon in which the image size is changed to a size corresponding to the A3 size and the color of the image is expressed in black and white indicating a monochrome document. The A3 monochrome icon 108 indicates that, when the A3 monochrome icon 108 is dropped on the correlated A3 monochrome printer icon to instruct a printing process, the document is printed on A3 paper in monochrome according to the set print a tribute. In other words, the original icon image reflecting the file attribute is changed to an icon image reflecting an output result based on the print attribute.

The user then views the changed icon image and determines that unsuitable printing will take place and thus moves 116 the document icon through a mouse operation. The user drags the document icon to a position on the A4 color printer icon 52. When the document icon is moved, the original image is used in the document icon and an A2 color icon 110 is displayed on the A4 color printer icon 52 in FIG. 3B.

Figure 3C:
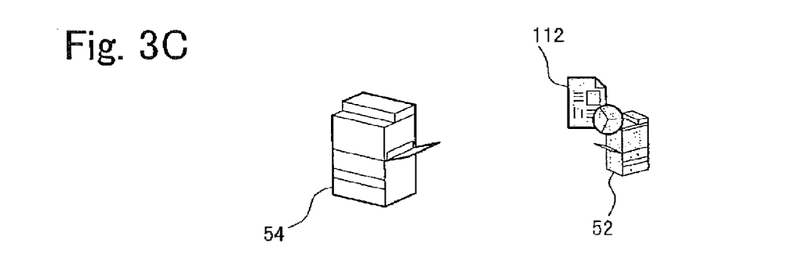

At the step of FIG. 3C, the A2 color icon 110 is changed to an A4 color icon 112. That is, an output configuration is estimated based on the print attribute of the A4 color printer icon and an A4 color icon 112 representing color printing on A4 size paper is displayed. When the user determines that this display configuration is satisfactory, the user instructs the printing process by dropping the document icon.

According to this configuration, the user can understand the print output result by the image of the document icon. When the output result differs from what the user expected, the user can drag the document icon to a position on another printer icon without dropping the document icon (without executing the printing process) and review the output result of the printer associated with the new printer icon. That is, with the change of color of the icon, a mistake between the color printing and monochrome printing is prevented, and, with the change of size and orientation of the icon, a mistake in paper setting is prevented, resulting in reduction of waste in printing processes.

Figure 4:
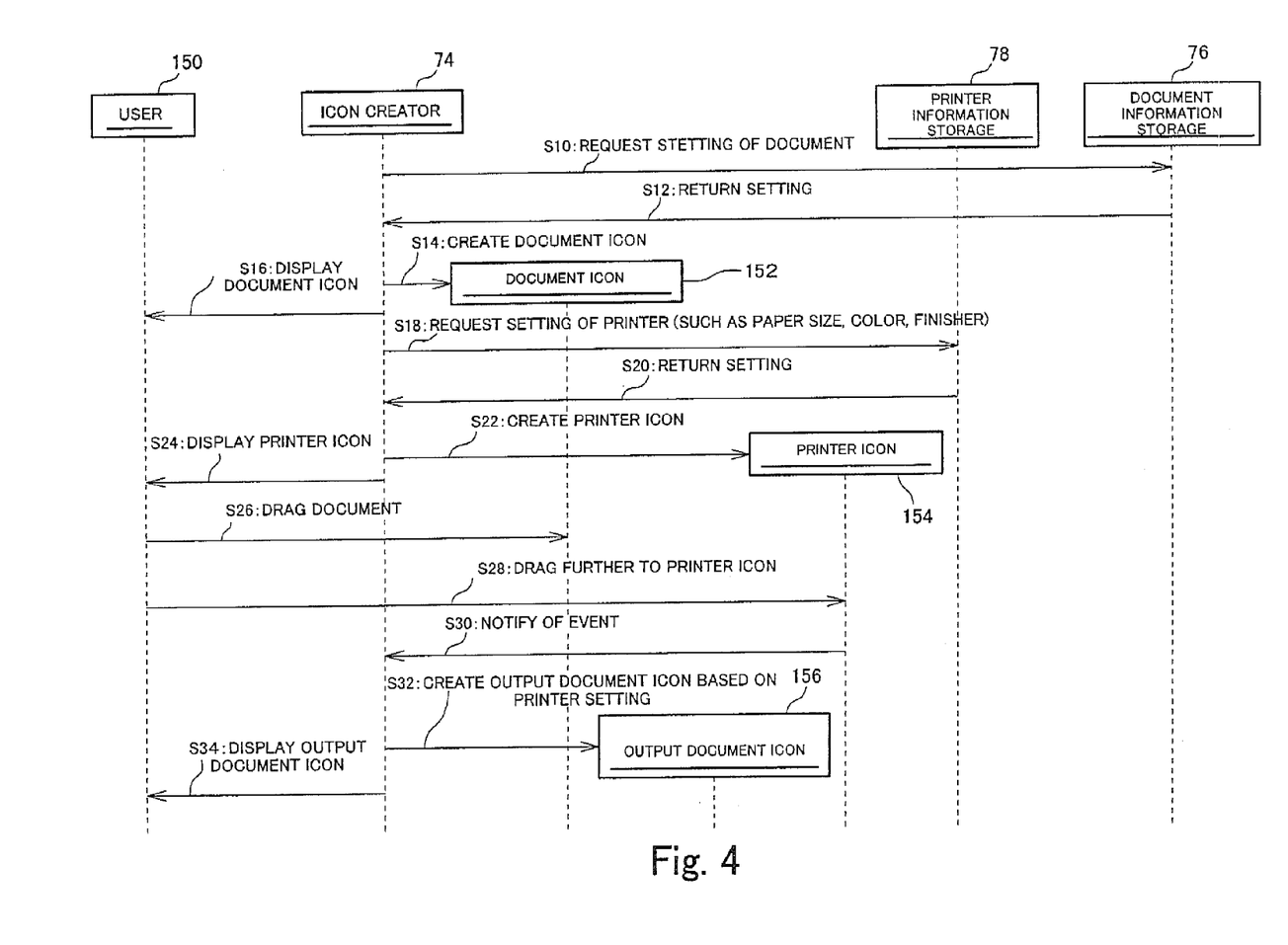
FIG. 4 is a diagram showing an example processing step.

A processing procedure for executing the above-described configuration will now be described referring to FIG. 4. FIG. 4 is a diagram chronologically showing processes executed by a user 150, the icon creator 74, the printer information storage 78, the document information storage 76, a document icon 152, a printer icon 154, and an output document icon 156 in a chronological sequence toward the downward direction.

The icon display on the desktop as shown in FIG. 1 is performed by the icon creator 74. The icon creator 74 first requests transmission or a setting (attribute) of a document associated with a document icon to be displayed (S10) and receives the transmitted result (S12). The icon creator 74 creates a display image based on the setting and internally creates the document icon 152 (S14). Then, the created document icon 152 is displayed on the display (S16) and the user 150 recognizes the document icon 152.

Similarly, the icon creator 74 requests the printer information storage 78 to transmit the settings (attributes) of the printer related to the printer icon to be displayed (S18) and receives the transmitted result (S20). The attributes of the printer includes, for example, paper size, paper orientation, color attribute, N-up setting, whether or not the document should be stapled, whether or not the document should be punched, and whether or not the document should be folded.

A display image is created based on the setting and a printer icon 154 is internally created (S22) and displayed on the display (S24).

The user can select a desired document icon 152 and drag the document icon-152 (S26). When the document icon 152 is dragged to the printer icon 154 (S28), the printer icon 154 detects that the printer icon 154 is correlated to the document icon 152 and sends notification of the generation of the event to the icon creator 74 (S30).

The icon creator 74 receiving the notification of the event internally creates an output document icon 156 which is a document icon representing an output result based on the setting of the printer and displays the output document icon 156 on the display (S34). The image of the output document icon 156 is created in a form, for example, in which the preview image is reduced based on the setting of the printer. Alternatively, it is also effective to reduce the size of the preview image after a larger preview image is actually created.

Next, alternative configurations of the present embodiment will be described referring to FIGS. 5-7.

Figure 5A:
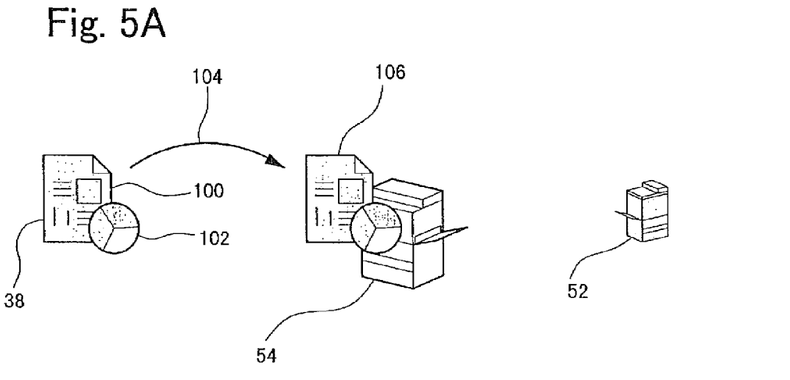
FIGS. 5A and 5B are diagrams showing an alternative example display when a document icon is dragged.
Figure 5B:
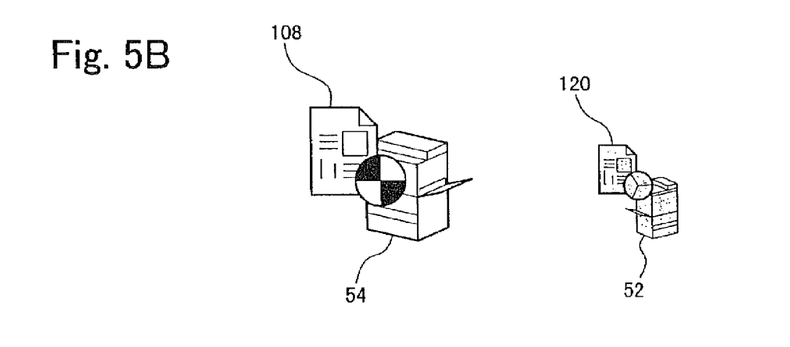

FIG. 5 is a diagram showing an alternative configuration of the embodiment shown in FIG. 3. The situation of FIG. 5A is identical to that of FIG. 3A, and the user drags the A2 color icon 106 onto the A3 monochrome printer icon 54. FIG. 5B is similar to FIG. 3B in that, in the step of FIG. 5B, the A2 color icon 106 is changed to the A3 monochrome icon 108. However, in FIG. 5B, in addition to this configuration, the A4 color icon 120 is displayed on the A4 color printer icon 52. In this manner, the user can know not only the image to be printed when a printing process is performed through the A3 monochrome printer icon 54 correlated by the drag operation, but also an image of a print output when printing process is performed through the A4 color printer icon 52, which is a different printer icon.

Specifically, in this configuration, when a correlation is made with a printing device, that is, when a document icon is dragged on a printer icon or an icon which is a print entry point including all printer icons, a document icon corresponding to the print output is displayed near all printer icons displayed on the display screen at that point or near a portion of the printer icons having a high matching of the print attribute and the file attribute. With this configuration, the user can refer to the displayed document icon to know the printer icon to be selected in order to execute an appropriate printing process.

Figure 6A:
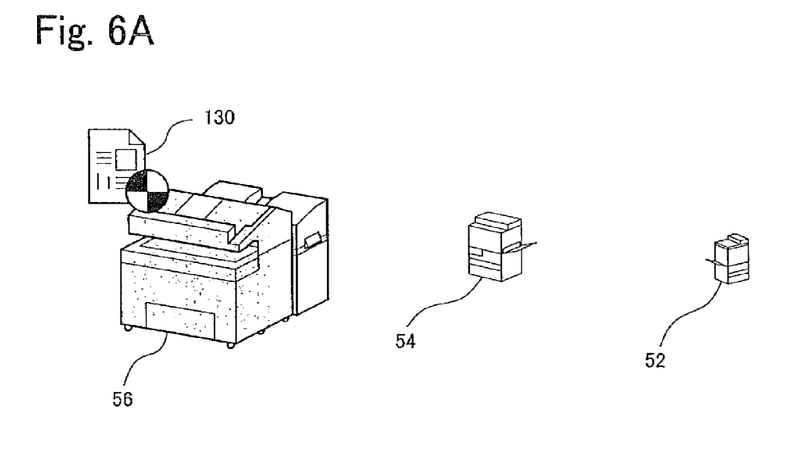
FIGS. 6A and 6B are diagrams showing another alternative example display when a document icon is dragged.
Figure 6B:
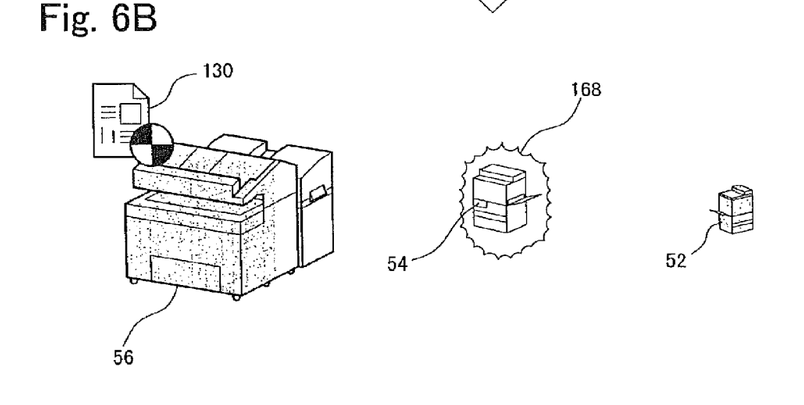

FIG. 6 shows an alternative configuration of the embodiment shown in FIG. 3. As shown in FIG. 6A, three printer icons including the A0 printer icon 56, A3 monochrome printer icon 54, and A4 color printer icon 52 are displayed on the desktop. The user drags the A3 monochrome icon 130 onto the A0 printer icon 56 by a drag operation. In a following step, as shown in FIG. 6B, a region 168 of bright color is formed around the A3 monochrome printer icon 54 to prompt the user to notice. As a result, the user can recognize that the printing process related to the A3 monochrome icon 130 which is being dragged should be performed through the A3 monochrome printer icon 54.

Specifically, with this configuration, when a correlation is made with a printing device, that is, when the document icon is dragged onto a printer icon or an icon which is a print entry point including all printer icons, one or a plurality of printer icons most suited for printing are determined based on a comparison between the print attribute which is set to all printer icons displayed on the display screen at that point and a file attribute of the document icon. Then, the printer icon which is determined as being suitable is displayed in such a manner as to attract the user's attention (attention display). In this manner, the user can refer to the attention display result to know the printer icon to be selected in order to execute suitable printing process. In addition to the attention display, it is also possible to display a document icon representing a print output as described with reference to FIG. 5.

Figure 7A:
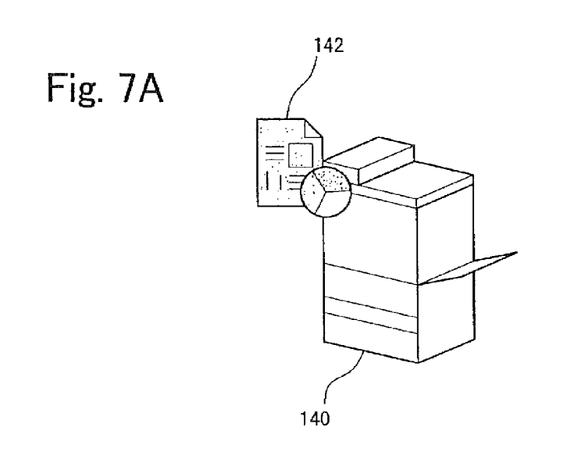
FIGS. 7A and 7B are diagrams showing yet another alternative example display when a document icon is dragged.

FIG. 7 is a diagram showing another alternative configuration of the embodiment shown in FIG. 3. In this alternative configuration, a case is considered in which, at the initial stage, only an overall printer icon 140 is shown on the desktop and no other printer icons are displayed. The overall printer icon 140 is an icon which is positioned at an upper hierarchical than the printer icons and is an icon which does not specify a printer and only instructs execution of a printing process. In the step of FIG. 7A, the user drags the document icon 142 to place the document icon 142 on the overall printer icon 140. The user may drop the document icon 142 at this point. In such a case, a printing process is executed according to a suitable print setting of a suitable printer based on a priority order which is a normally set or by determining an optimum printer through comparison of the file attribute and the print attribute.

However, this configuration considers a case in which the user does not drop the document icon 142. In the step of FIG. 7B, an icon display process is executed. Specifically, the overall printer icon 140 is displayed in darker display and three printer icons including an A0 printer icon 144, an A3 monochrome printer icon 146, and an A4 color printer icon 148 are newly displayed near the overall printer icon 140. As already described, the image of these printer icons have sizes and colors corresponding to the print setting and the user can visually and intuitionally select an individual printer icon.

This configuration can be combined with the various configurations described above. For example, it is possible to display a document icon representing an output image overlapping the printer icon to be newly displayed or to display only a printer icon which is determined as being capable of executing an optimum printing process.

Figure 7B:
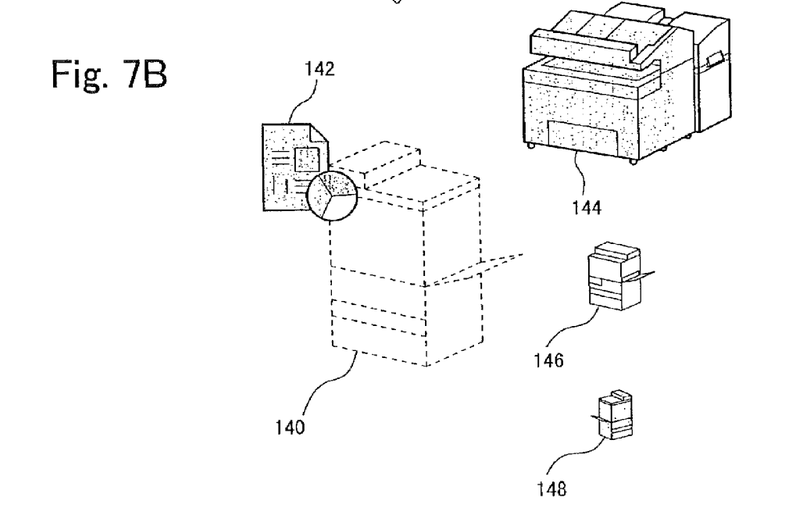

It is also preferable that, in the configuration of FIG. 7B, when a printer icon is selected, a printer icon for changing or adding setting of the printer is newly displayed. For example, when the document icon 142 is dragged to the A4 color printer icon 148, a printer icon in which the paper size is changed to A5 in this printer and a printer icon in which setting for N-up printing is added in this printer may be newly displayed.

The new printer icon is preferably an icon representing a change or addition of a setting which the user would desire. For example, when a color document icon is correlated with a color printer icon, the color attribute of the document file and the print color attribute of the printer match each other, and, thus, if the user does not immediately drop the document icon in this situation, it can be inferred that the user desires a more detailed setting. Therefore, in this case, it would be effective to display a document icon for performing various detail settings such as N-up print setting, paper size setting, and print page designation. On the other hand, when a color document icon is correlated to a monochrome printer icon, the color attribute of the document file differs from the print color attribute of the printer, and, thus, it can be deduced that the user wishes precise printing in which the attributes match each other. Therefore, if the user does not immediately drop the document icon in this situation, it would be effective to simplify the display by, for example, displaying only the printer icon for N-up printing. In other words, it is preferable to change the number and type of printer icons to be displayed based on a match or difference between the file attribute and the print attribute and display the printer icons according to an object of the printing process.

In the above description, examples of the embodiment of the present invention have been described exemplifying an icon on a desktop. The present invention is not limited to such a configuration, however, and may be applied to, for example, an icon in an application window. Various alternative configurations will now be described.

In one configuration of the present invention, it is preferable that the color attribute obtained in the file attribute obtaining step includes information indicating whether or not a document represented by the document file is expressed in color, and a document icon having a color image is displayed in the display step when the document is expressed in color and a document icon having a monochrome image is displayed in the display step when the document is not expressed in color. Information indicating whether or not the document is expressed in color may be information as to whether or not a color colorimetric system is used or whether or not the document is actually expressed with multiple colors by the color colorimetric system. The information is based on the representation format in the former case and based on the number of colors substantially represented in the document in the latter case.

It may be preferable that the color attribute obtained in the file attribute obtaining step includes information indicating a percentage of a color region contained in a document represented by the document file, and a document icon having an image representing the percentage of the color region is displayed in the display step. The information of the percentage of the color region is information which allows recognition of how much color region is contained within a document by a plurality of levels and may be information indicating the ratio or proportion of the color region within the overall region (including or not including the blank region), or information which represents an absolute magnitude of the color region such as an area and number of characters. The representation of the ratio of the color region in the display step is achieved by, for example, showing a percentage on a pie chart with the divided area changed or showing the relative size of the color region using any of a plurality of types of images having different areas.

In one embodiment of the present invention, it is preferable that the program allows the computer to execute the steps of a print attribute obtaining step in which a print color attribute for a case when the document file is printed using a printer to which an output setting from the computer is set is obtained and an image changing step in which, if the color attribute obtained in the file attribute obtaining step and the print color attribute obtained in the print attribute obtaining step are different from each other, an image of a document icon is changed to an image reflecting the print color attribute when the document icon representing the document file is correlated to a printer icon representing the print setting of the printer.

The print color attribute is information regarding color setting used in the execution of the printing process. More specifically, the print color attribute may be, for example, information of whether the document is to be printed in monochrome or in color (multi-color printing using CMYK mode or the like) or information of a number of colors that can be expressed in the printing process. The correlation between the document icon and the printer icon is achieved by, for example, dragging-and-dropping the document icon to the printer icon or by inputting a printer instruction while the document icon is selected. When the correlation is made, it is ascertained whether or not the print color attribute is different from the color attribute based on (1) a result of the print attribute obtaining step executed in advance or at this timing and (2) a result of the file attribute obtaining step executed in advance or at that timing. When the print color attribute is different from the color attribute, the image of the document icon is changed to an image reflecting the print color attribute. Examples of the change include making the original icon image into a color image or a monochrome image or additionally displaying a new image reflecting the print color attribute near the original icon image.

In the present embodiment, it may be preferable that the program allows the computer to execute the steps of a print attribute obtaining step in which a print color attribute for a case when the document file is printed using at least one print setting of at least one printer to which an output setting from the computer is set is obtained, a determination step in which the print color attribute obtained in the print attribute obtaining step and the color attribute obtained in the file attribute obtaining step are compared to determine a printer or a print setting suitable for printing of the document file, and an attention display step in which a printer icon representing a printer or a print setting determined as being suitable for the printing is displayed in a manner to attract an attention when the document icon of the document file is being selected by a user.

The determination of suitability in the determination step can be performed using a determination standard which is set in advance. Typically, a printer or print setting can be determined to be suitable when the color attribute and the print color attribute match each other, but it is also possible to include results of comparison of elements other than color such as, for example, the size of image (paper), orientation of the image (paper), N-upsetting, and duplex print setting in the determination standard. When the document icon of the document file is being selected by the user (for example, when the document icon is caught by a user input device such as the mouse, when a predetermined time elapses while the icon is being caught, when the document icon is correlated with a specific printer icon or overall printer icon while the icon is being caught, and when a separate print instruction signal is supplied), the printer icon of the printer or print setting determined as being suitable for the printing is displayed in a manner to attract attention. The attention display refers to a display which visually prompts the user to notice and can be realized by performing a chronic change display (for example, display of a new image or flashing or movement of the displayed image) of emphasizing the icon compared to the surroundings through brightness or color contrast.

It is also possible to extend this configuration to control an icon based on an arbitrary file attribute and print attribute (that is, the color attribute may or may not be included). More specifically, according to the present invention, there is provided an icon control program, an icon control unit, and an icon controlling method which, when executed, allows a computer to execute the steps of a file attribute obtaining step in which an attribute of a document file managed by the computer is obtained, a display step in which a document icon representing the document file and having an image reflecting the obtained attribute is displayed on a display screen, a print attribute obtaining step in which a print attribute for a case when the document file is printed using at least one print setting of at least one printer to which an output setting from the computer is set is obtained, a determination step in which the attribute obtained in the file attribute obtaining step and the print attribute obtained in the print attribute obtaining step are compared to determine a printer or a print setting suitable for a printing process of the document file, and an attention display step in which a printer icon representing a printer or a printer setting determined as being suitable for the printing process is displayed in a manner to attract attention when the document icon of the document file is selected by a user.

In the present embodiment, it may be preferable that a print color attribute related to a printer icon displayed on the display screen is obtained in the print attribute obtaining step and a printer icon related to the printing process determined as being suitable is displayed in a manner to attract more attention compared to other printer icons in the attention display step. It may also be preferable that, in the attention display step, when the print setting represented by the printer icon to which the document icon is correlated is determined as being not suitable in the determination step, a printer icon which represents print setting determined as being suitable is newly displayed on the display screen. The new display appears, for example, near the printer icon.

In the present embodiment, it may be preferable that, in the attention display step, when the print setting represented by the printer icon to which the document icon is correlated is determined as being suitable in the determination step, a printer icon which represents more limiting print setting is newly displayed on the display screen. Examples of limiting print settings include a paper size setting, paper orientation setting, N-up setting, and duplex print setting.

In the present embodiment, it may also be preferable that, in the attention display step, a printer icon positioned at a lower hierarchical level is displayed based on a hierarchical structure of the printer or print setting. More specifically, a hierarchical structure for display is set for the plurality of printers or print setting of one or a plurality of printers and the display is performed based on the set hierarchical structure in the attention display step. For example, when the originally selected icon is a printer icon representing all printers, it is possible to set and display individual printer icon as the printer icon at a lower hierarchical level. When, on the other hand, the originally selected icon is a printer icon representing a certain printer, it is possible to display a printer icon related to other print settings of the printer as the printer icon of the lower hierarchical level. Moreover, when the originally selected icon represents a certain print setting, it is possible to display a printer icon related to the print process in which another print setting is added to the selected print setting as the printer icon of the lower hierarchical level. When multiple levels are set as the lower hierarchical levels, it is possible to display, for example, in a sequential manner such that when a printer icon of a certain hierarchical level is selected, a printer icon positioned at a level immediately below that of the printer icon is displayed.

According to one aspect of the present invention, a computer in this description refers to a device which operates by a hardware having a computation function controlled by software, and includes both general-purpose computers, such as a personal computer, and computing units having a more specialized function, such as a copier. The computer can display an image on a display screen such as a liquid crystal display or the like. The display screen may be built into the computer or external to the computer. A program which controls the icon is a program which controls the computation function of the computer to execute a predetermined operation and may be, for example a program which forms a part of an OS (Operating System) which controls basic operations of the computer or a program which forms a part of application software which is run on the OS. Examples of the recording medium include, for example, a DVD (Digital Versatile Disc), a CD (compact disc), a floppy disk, a semiconductor memory, and a hard disk drive on which the program is recorded.

According to one aspect of the present invention, in the file attribute obtaining step, a color attribute of a document file managed by the computer by storing in the computer or sharing with another device is obtained. The color attribute of the document file is information which indicates a color characteristic of the document represented by the document file, and include, for example, colorimetric system (concentration only, RGB system, etc.) which is being used, actual number of colors (256 colors, 10,000 colors, etc.), area or ratio of the monochrome region and color region. In the display step, the document icon representing the document file, that is, the icon provided corresponding to the document file in order to show presence and type of the document file is displayed on a display screen on a desktop or within an application window. The color attribute of the image of the displayed document icon correlates with the obtained color attribute.

According to one aspect of the present invention, by displaying a document icon reflecting the output result with such a structure, it is possible for a user to simply visually understand the color attribute of the document file when viewing the document icon. Thus, it is possible to, for example, intuitionally determine whether the document should be printed using a color printer or a monochrome printer, and, therefore, it is possible to effectively prevent printing decision errors between color and monochrome and to reduce waste of printer resources.

The disclosure of Japanese Patent Application No. 2005-74737 filed on Mar. 16, 2005 including the specification, claims drawings, and abstract is incorporated herein by reference in its entirety.

What is claimed is:

1. A recording medium which stores a program which, when executed, allows a computer to perform a function comprising:

obtaining color attribute information of a document file, the color attribute information including information indicating whether the document file is expressed in color, the color attribute information including information indicating a percentage of a color region contained in the document file; and displaying a document icon which represents the document file, the document icon including a thumbnail image of the document file and a region percentage display image, the thumbnail image of the document file being displayed in color when the obtained color attribute information indicates that the document file is expressed in color and the region percentage display image being an image of a graph representing the percentage of the color region in the document file in accordance with the obtained color attribute information.

2. The recording medium according to claim 1, wherein the thumbnail image of the document file being displayed in monochrome when the obtained color attribute information indicates that the document file is not expressed in color.

3. The recording medium according to claim 1, the function further comprising:

obtaining print color attribute information for a printer, the print attribute information including information indicating the color capabilities of the printer; and changing the document icon such that the thumbnail image of the document file is changed from being displayed in color to being displayed in monochrome when the obtained print color attribute information indicates that the printer only has monochrome print capabilities.

4. The recording medium according to claim 1, the function further comprising:
  obtaining print color attribute information for a printer, the print attribute information including information indicating the color capabilities of the printer;
  comparing the obtained color attribute information of a document file and the obtained print color attribute;
  determining if the printer is suitable for printing of the document file based on comparing the obtained color attribute information of a document file and the obtained print color attribute; and
  displaying a printer icon, associated with the printer, in a manner to attract attention when the document icon of the document file is selected by a user when it is determined that the printer is suitable for printing of the document file.

5. The recording medium according to claim 4, wherein when a print setting represented by the printer icon to which the document icon is correlated is determined as being not suitable for printing of the document file, a printer icon which represents print setting determined as being suitable is newly displayed.

6. The recording medium according to claim 4, wherein when a print setting represented by the printer icon to which the document icon is correlate is determined as being suitable for printing of the document file, a printer icon which represents a more limiting print setting is newly displayed.

7. The recording medium according to claim 6, wherein a printer icon positioned at a lower hierarchical level is displayed based on a hierarchical structure of the associated printer or print setting associated with the printer.

8. The recording medium according to claim 1, the function further comprising:
  obtaining print output orientation information for a printer, the print output orientation information including information indicating orientation of the output medium; and
  changing the document icon such that the thumbnail image of the document file is changed to show the effect of the orientation of the output medium upon the printing of the document file.

9. A computer comprising:
  a file attribute obtaining unit which obtains color attribute information of a document file, the color attribute information including information indicating whether the document file is expressed in color, the color attribute information including information indicating a percentage of a color region contained in the document file;
  a document icon generator for generating a document icon associated with the document file, the generated document icon including a thumbnail image of the document file and a region percentage display image, the thumbnail image of the document file being a color representation of the document file when the obtained color attribute information indicates that the document file is expressed in color, the region percentage display image being an image of a graph representing the percentage of the color region in the document file in accordance with the obtained color attribute information; and
  a display which displays the generated document icon associated with the document file.

10. The computer according to claim 9, wherein the thumbnail image of the document file being a monochrome representation of the document file when the obtained color attribute information indicates that the document file is not expressed in color.

11. The computer according to claim 9, further comprising:
  a print attribute obtaining unit which obtains a print color attribute information for a printer, the print attribute information including information indicating the color capabilities of the printer;
  said document icon generator changing the document icon such that the thumbnail image of the document file is changed from being a color representation to being a monochrome representation when the obtained print color attribute information indicates that the printer only has monochrome print capabilities.

12. The computer according to claim 9, further comprising:
  a print attribute obtaining unit which obtains print color attribute information for a printer, the print attribute information including information indicating the color capabilities of the printer;
  a comparing unit which compares the obtained color attribute information of a document file and the obtained print color attribute;
  a determining unit which determines if the printer is suitable for printing of the document file based on comparing the obtained color attribute information of document file and the obtained print color attribute; and
  said display displaying a printer icon, associated with the printer, in a manner to attract attention when the document icon of the document file is selected by a user when it is determined that the printer is suitable for printing of the document file.

13. The computer according to claim 12, wherein when a print setting represented by the printer icon to which the document icon is correlated is determined as being not suitable for printing of the document file, a printer icon which represents print setting determined as being suitable is newly displayed on said display.

14. A method executed in a computer comprising:
  obtaining color attribute information of a document file, the color attribute information including information indicating whether the document file is expressed in color, the color attribute information including information indicating a percentage of a color region contained in the document file; and
  displaying a document icon which represents the document file, the document icon including a thumbnail image of the document file and a region percentage display image, the thumbnail image of the document file being displayed in color when the obtained color attribute information indicates that the document file is expressed in color and the region percentage display image being an image of a graph representing the percentage of the color region in the document file in accordance with the obtained color attribute information.

15. The method according to claim 14, wherein the thumbnail image of the document file being displayed in monochrome when the obtained color attribute information indicates that the document file is not expressed in color.

16. The method according to claim 14, further comprising:
  obtaining print color attribute information for a printer, the print attribute information including information indicating the color capabilities of the printer; and
  changing the document icon such that the thumbnail image of the document file is changed from being displayed in color to being displayed in monochrome when the obtained print color attribute information indicates that the printer only has monochrome print capabilities.

17. The method according to claim 14, further comprising:
obtaining print color attribute information for a printer, the print attribute information including information indicating the color capabilities of the printer;
comparing the obtained color attribute information of a document file and the obtained print color attribute;
determining a if the printer is suitable for printing of the document file based on comparing the obtained color attribute information of a document file and the obtained print color attribute; and
displaying a printer icon, associated with the printer, in a manner to attract attention when the document icon of the document file is selected by a user when it is determined that the printer is suitable for printing of the document file.

18. The method according to claim 17, wherein when a print setting represented by the printer icon to which the document icon is correlated is determined as being not suitable for printing of the document file, a printer icon which represents print setting determined as being suitable is newly displayed.

19. The method according to claim 14, further comprising:
obtaining print output orientation information for a printer, the print output orientation information including information indicating orientation of the output medium; and
changing the document icon such that the thumbnail image of the document file is changed to show the effect of the orientation of the output medium upon the printing of the document file.

20. A recording medium which stores a program which, when executed, allows a computer to perform a function comprising:
obtaining color attribute information of a document file, the color attribute information including information indicating whether the document file is expressed in color, the color attribute information including information indicating a percentage of a color region contained in the document file;
displaying a document icon which represents the document file, the document icon including a thumbnail image of the document file and a region percentage display image, the thumbnail image of the document file being displayed in color when the obtained color attribute information indicates that the document file is expressed in color and the region percentage display image being an image of a graph representing the percentage of the color region in the document file in accordance with the obtained color attribute information;
comparing the obtained color attribute and at least one print setting of at least one printer;
determining a print setting suitable for printing of the document file based on comparing the obtained color attribute and at least one print setting of at least one printer; and
displaying a printer icon which represents a print setting of a printer determined as being suitable for the printing of the document file, in a manner to attract attention, when the document icon of the document file is selected by a user.

21. The recording medium according to claim 20, wherein when the print setting represented by the printer icon to which the document icon is correlated is determined as being not suitable, a printer icon which represents print setting determined as being suitable is newly displayed.

22. The recording medium according to claim 20, the function further comprising:
obtaining print output orientation information for a printer, the print output orientation information including information indicating orientation of the output medium; and
changing the document icon such that the thumbnail image of the document file is changed to show the effect of the orientation of the output medium upon the printing of the document file.

* * * * *